US009946499B1

(12) United States Patent
Tanaka et al.

(10) Patent No.: US 9,946,499 B1
(45) Date of Patent: Apr. 17, 2018

(54) INFORMATION PROCESSING APPARATUS, FUNCTION USAGE AMOUNT MANAGEMENT SYSTEM, AND NON-TRANSITORY COMPUTER READABLE STORAGE MEDIUM

(71) Applicant: FUJI XEROX CO., LTD., Tokyo (JP)

(72) Inventors: Noriaki Tanaka, Kanagawa (JP); Yusaku Kurihara, Kanagawa (JP); Tsubasa Kitai, Kanagawa (JP); Satoshi Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/479,643

(22) Filed: Apr. 5, 2017

(30) Foreign Application Priority Data

Sep. 26, 2016 (JP) .................. 2016-186934

(51) Int. Cl.
*G06F 3/12* (2006.01)
*G06Q 10/06* (2012.01)

(52) U.S. Cl.
CPC .......... *G06F 3/1239* (2013.01); *G06F 3/1219* (2013.01); *G06F 3/1288* (2013.01); *G06Q 10/06313* (2013.01)

(58) Field of Classification Search
CPC .... G06F 3/1239; G06F 3/1219; G06F 3/1288; G06Q 10/06313
USPC ....................................... 358/1.15
See application file for complete search history.

(56) References Cited

U.S. PATENT DOCUMENTS

| 2007/0257954 | A1* | 11/2007 | Nishizaka | ............ B41J 2/17509 347/14 |
| 2010/0118340 | A1* | 5/2010 | Yamada | ................ G06F 3/1204 358/1.15 |
| 2011/0051180 | A1* | 3/2011 | Sasagawa | ............ G06F 3/1222 358/1.15 |
| 2011/0188073 | A1* | 8/2011 | Akutsu | .................. G06F 15/00 358/1.15 |

FOREIGN PATENT DOCUMENTS

| JP | 2007-034701 A | 2/2007 |
| JP | 2007-299265 A | 11/2007 |

* cited by examiner

*Primary Examiner* — Allen H Nguyen
(74) *Attorney, Agent, or Firm* — Oliff PLC (57) ABSTRACT

An information processing apparatus includes a transmitter and an update unit. The transmitter refers to a memory in response to an availability determination request with designation of a requested usage amount of a function. The memory stores a usable amount for each of second periods which are set by dividing a first period into plural periods. An upper limit value of a usage amount of the function which it is not allowed to exceed being set to the first period. The usable amount for each of the second periods is set as an initial value by allocating the upper limit value to the second periods. The transmitter transmits executability information to a request source of the availability determination request when the function in the requested usage amount is executable. The update unit updates the usable amounts stored in the memory based on the requested usage amount.

7 Claims, 5 Drawing Sheets

PRINTABLE AMOUNT INFORMATION

| SETTING PERIOD 1 | PRINTABLE AMOUNT(SHEETS) | SETTING PERIOD 2 |
|---|---|---|
| April | 1000 | May to March |
| May | 1000 | June to March |
| June | 1000 | July to March |
| July | 1000 | August to March |
| August | 1000 | September to March |
| September | 1000 | October to March |
| October | 1000 | November to March |
| November | 1000 | December to March |
| December | 1000 | January to March |
| January | 1000 | February to March |
| February | 1000 | March |
| March | 1000 | — |

PRINTABLE AMOUNT INFORMATION

| SETTING PERIOD 1 | PRINTABLE AMOUNT(SHEETS) | SETTING PERIOD 2 |
|---|---|---|
| April | 20 | May to March |
| May | 50 | June to March |
| June | 10 | July to March |
| July | 1000 | August to March |
| August | 1000 | September to March |
| September | 1000 | October to March |
| October | 1000 | November to March |
| November | 1000 | December to March |
| December | 1000 | January to March |
| January | 1000 | February to March |
| February | 1000 | March |
| March | 1000 | — |

INFORMATION PROCESSING APPARATUS, FUNCTION USAGE AMOUNT MANAGEMENT SYSTEM, AND NON-TRANSITORY COMPUTER READABLE STORAGE MEDIUM

CROSS-REFERENCE TO RELATED APPLICATIONS

This application is based on and claims priority under 35 USC 119 from Japanese Patent Application No. 2016-186934 filed Sep. 26, 2016.

BACKGROUND

(i) Technical Field

The present invention relates to an information processing apparatus, a function usage amount management system, and a non-transitory computer readable storage medium.

(ii) Related Art

A management method of determining the upper limit of the usage amount (e.g., the number of printing sheets) of a multifunction device for a predetermined period for each user (or department, etc.) for the purpose of reducing a total cost of ownership (TCO) or the like has been well known. However, when the predetermined period is relatively long such as one year, individual users or administrators are overloaded with management of usage amounts. If a predetermined amount is completely consumed in less than a year, an administrator is troubled in responding to the user. Meanwhile, when the predetermined period is set as a relatively short period, it becomes easy to manage the usage amount, but there is a possibility that it is impossible to cope with a change in a usage amount according to times.

SUMMARY

According to an aspect of the invention, an information processing apparatus includes a transmitter and an update unit. The transmitter refers to a memory in response to an availability determination request with designation of a requested usage amount of a function. The memory stores a usable amount for each of second periods which are set by dividing a first period into plural periods. An upper limit value of a usage amount of the function which it is not allowed to exceed being set to the first period. The usable amount for each of the second periods is set as an initial value by allocating the upper limit value to the second periods. The transmitter transmits executability information to a request source of the availability determination request when the function in the requested usage amount is executable. The update unit updates the usable amounts stored in the memory based on the requested usage amount. Even if the usable amount in a second period corresponding to a point of time when the availability determination request is received is less than the requested usage amount, the transmitter transmits the executability information when a usable amount obtained by carrying forward a remaining usable amount from a past second period in the first period is equal to or larger than the requested usage amount.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described with reference to accompanying drawings.

Figure 1:
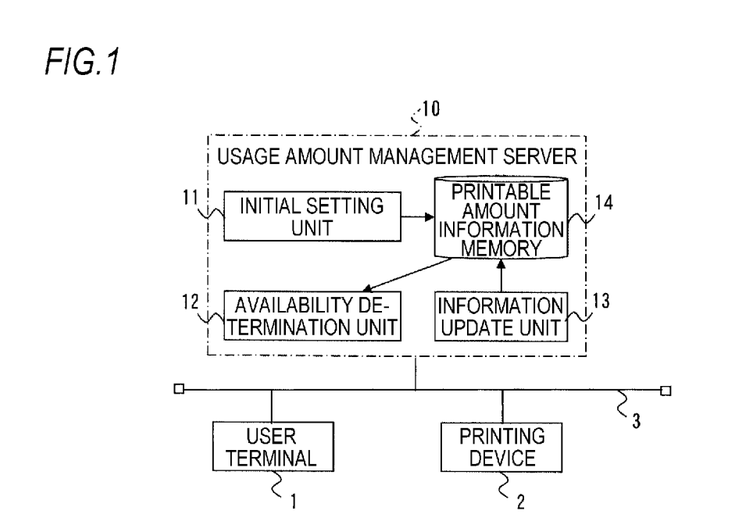
FIG. 1 is a block diagram illustrating an overall configuration of a function usage amount management system according to an exemplary embodiment of the present invention and a usage amount management server according to the exemplary embodiment.

FIG. 1 is a block diagram illustrating an overall configuration of a function usage amount management system according to an exemplary embodiment of the present invention and a usage amount management server according to the exemplary embodiment. FIG. 1 illustrates a configuration in which a user terminal 1, a printing device 2, and a usage amount management server 10 are connected via a network 3. The user terminal 1 is an information terminal device used by a user who uses the present system. In the exemplary embodiment, it is assumed that the user terminal 1 is implemented by a personal computer (PC). The printing device 2 is a device that provides the user with a print function. In the exemplary embodiment, the printing device 2 will be described as an example of a function to provide printing to the user in such a manner. In the exemplary embodiment, it is assumed that the printing device 2 is implemented by a multifunction device equipped with a copy function or a FAX function as well as a print function, as an image forming apparatus. Plural user terminals 1 and plural printing devices 2 may be connected to the network 3. The user terminals 1 are only required to have functions equivalent to each other, and the printing devices are only required to have functions equivalent to each other. For convenience of drawings, one user terminal 1 and one printing device 2 are illustrated in FIG. 1.

Figure 2:
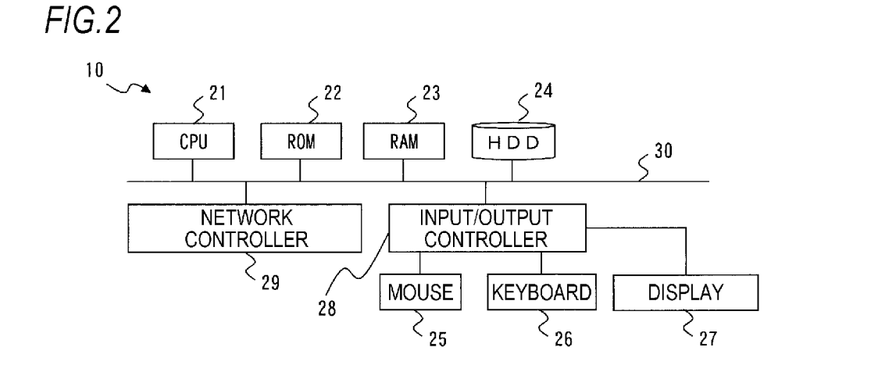
FIG. 2 is a view illustrating a hardware configuration of a server computer that constitutes a usage amount management server in the exemplary embodiment.

The usage amount management server 10 is a server computer corresponding to an information processing apparatus according to this exemplary embodiment of the present invention. A hardware configuration of the server computer that constitutes the usage amount management server 10 in the exemplary embodiment is illustrated in FIG. 2. The server computer that constitutes the usage amount management server may be implemented by a general-purpose hardware configuration according to the related art. That is, the usage amount management server 10 is configured as follows. That is, connected to an internal bus 30 are a CPU 21, a ROM 22, a RAM 23, a hard disk drive (HDD) 24, an input/output controller 28, and a network controller 29 provided as a communication unit as illustrated in FIG. 2. The input/output controller 28 connects to a mouse 25 and a keyboard 26 which are provided as input units, and a display 27 which is provided as a display device.

Referring back to FIG. 1, the usage amount management server 10 according to the exemplary embodiment includes an initial setting unit 11, an availability determination unit 12, an information update unit 13, and a printable amount information memory 14. Constituent elements not referred to in description on the exemplary embodiment will be omitted in FIG. 1. The initial setting unit 11 performs an initial setting of printable amount information to be stored in the printable amount information memory 14. In the exemplary embodiment, the number of printing sheets is described as an example of a usage amount of a function. The availability determination unit 12 serves as a transmitter that transmits executability information to the printing device 2, which is a request source of an availability determination request, when printing in the a requested usage amount is available in response to the availability determination request which designates a specified number of printing sheets (the requested usage amount) from the printing device 2. The information update unit 13 serves as an update unit that updates a printable amount stored in the printable amount information memory 14 based on the number of printing sheets (requested usage amount).

Figure 3:
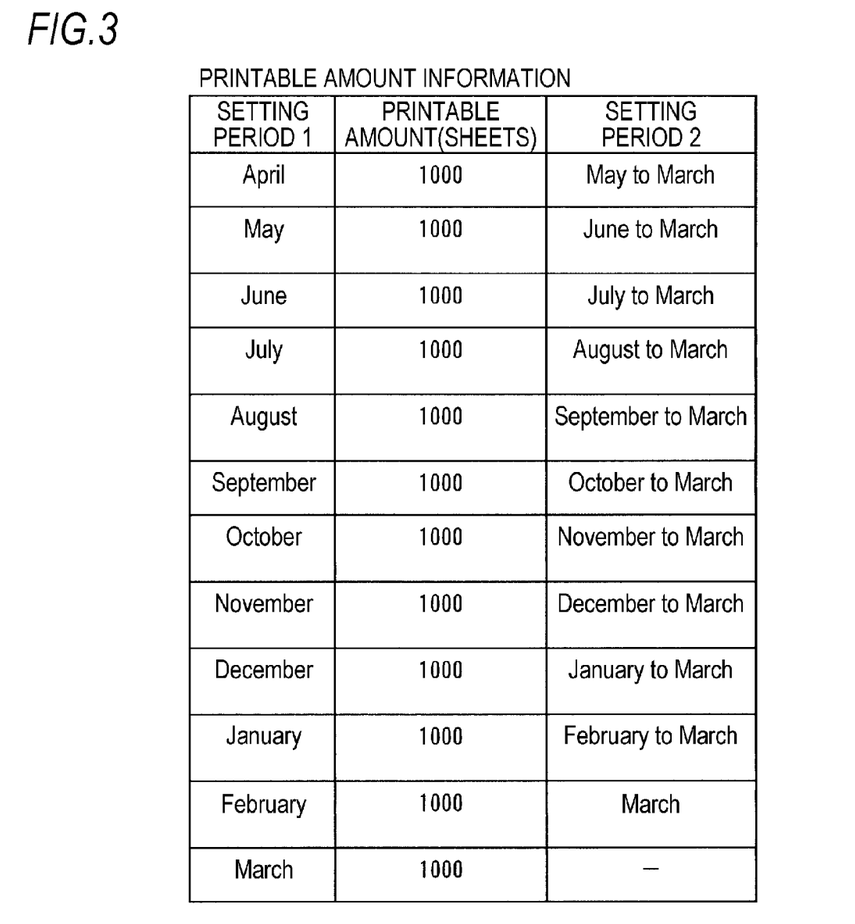
FIG. 3 is a view illustrating an example of a data structure of printable amount information stored in a printable amount information memory in the exemplary embodiment.

FIG. 3 is a view illustrating an example of a data structure of printable amount information stored in the printable amount information memory 14 in the exemplary embodiment. In the printable amount information, a setting period 1, a printable amount and a setting period 2 are set in association with each month. It is assumed that for the purpose of reducing TCO, or the like, the upper limit value of the number of printing sheets of the printing device 2 in one year is determined for each user or each group such as a department. In the case where one year is set as a first period to which the upper limit value of the number of printing sheets which it is not allowed to exceed is set, a month is set as a second period that is set by dividing one year into plural periods in the exemplary embodiment. In the printable amount included in the printable amount information, the number of printable sheets in each month is set. In the exemplary embodiment, when the upper limit value of the number of printing sheets, which it is not allowed to exceed, in one year is set to 12,000, the initial setting unit 11 sets an initial value of the printable amount in each month by allocating the upper limit value to the respective months. In FIG. 3, one year is set from April 1 to the end of March, while the period of one year may be properly set according to a system operation or the like. In the setting period 1 included in the printable amount information, each month corresponding to the above described second period is set. In the setting period 2, the remaining period within the first period is set for each setting period 1. Accordingly, for March which is the last period, there is no remaining period.

The printable amount information may be set for each user or group to be used as a management unit of the usage amount. That is, FIG. 3 illustrates a setting example for one management unit. The printable amount information illustrated in FIG. 3 may be set for each management unit so that a printing usage amount may be managed for each management unit. As the group, various things such as, for example, a business office in a company, a department, an office room may be set. An administrator may form a group according to the operation or the like, and set printable amount information for each group.

The initial setting unit 11 sets the second period (setting period 1) to be set in the printable amount information memory 14, the first period that is an origin of the second periods, and an initial value of the printable amount in each setting period 2 and the setting period 1, according to contents input and designated by the administrator or the like.

The constituent elements 11 to 13 in the usage amount management server 10 are implemented by a cooperative operation of a computer that constitutes the usage amount management server 10, and a program operating on the CPU 21 mounted in the computer. The printable amount information memory 14 is implemented by the HDD 24 mounted in the usage amount management server 10. Alternatively, the RAM 23 or an external memory may be used via a network.

The program used in the exemplary embodiment may be not only provided by a communication unit, but also provided while stored in a computer-readable recording medium such as a CD-ROM or a USB memory. The program provided from the communication unit or the recording medium is installed in the computer, and various processes are implemented when the CPU of the computer sequentially executes the program.

Hereinafter, an operation in the exemplary embodiment will be described. Here, in the following description, it is assumed that one user as an individual requests printing.

When the user sends a print request to the printing device 2 from the user terminal 1, the printing device 2 transmits a print availability determination request to the usage amount management server 10 according to the print request. The print availability determination request includes at least a user ID by which a user who made a request is identified and the number of printing sheets (requested usage amount). Hereinafter, descriptions will be made on, using a flowchart illustrated in FIG. 4, a print availability determining process executed by the availability determination unit 12 when the usage amount management server 10 receives the print availability determination request from the printing device 2.

Figure 4:
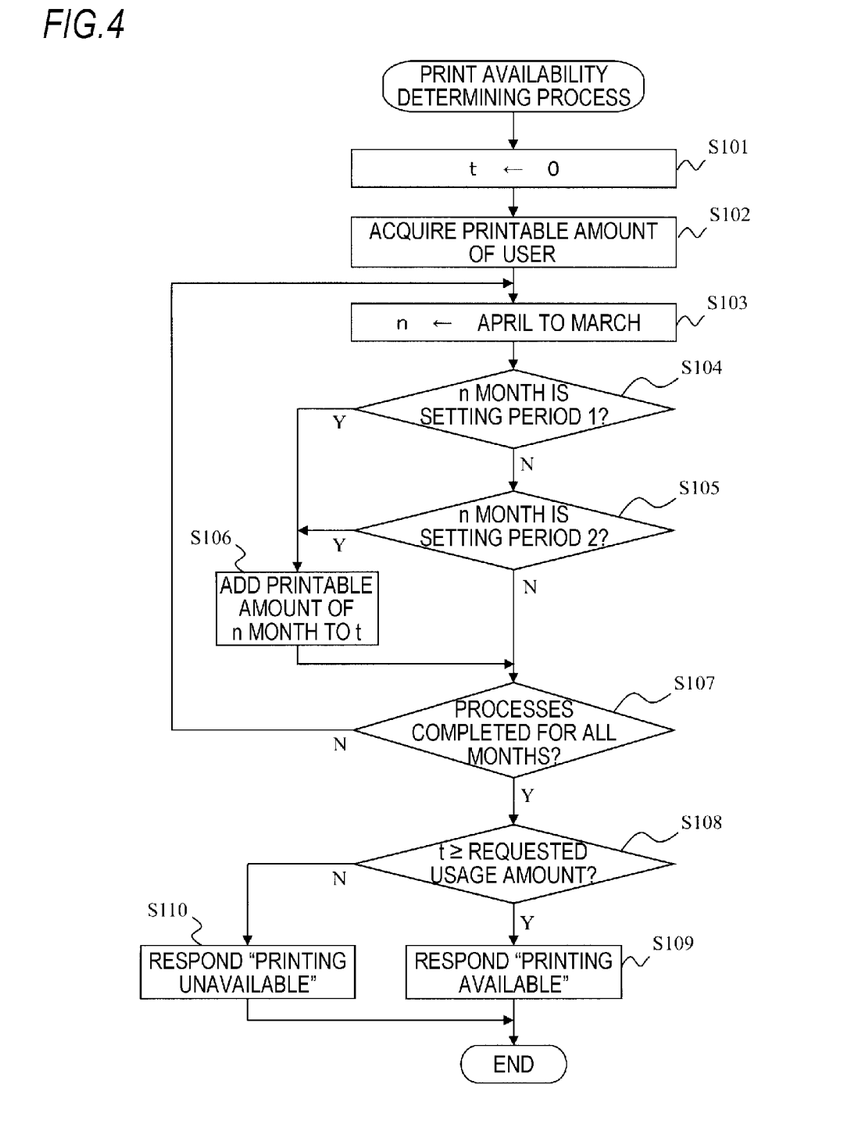
FIG. 4 is a flowchart illustrating a print availability determining process in the exemplary embodiment.

The availability determination unit 12, when activated upon receipt of the print availability determination request, initiates a variable t that indicates a printable amount in the corresponding month, as 0 (step 101). Subsequently, the availability determination unit 12 reads and acquires printable amount information corresponding to a user who requested printing from the printable amount information memory 14 (step 102). Then, the following process is repeatedly executed based on the acquired printable amount information for all months. Here, in the following description, it is assumed that the print availability determination request is received in June.

Figure 5:
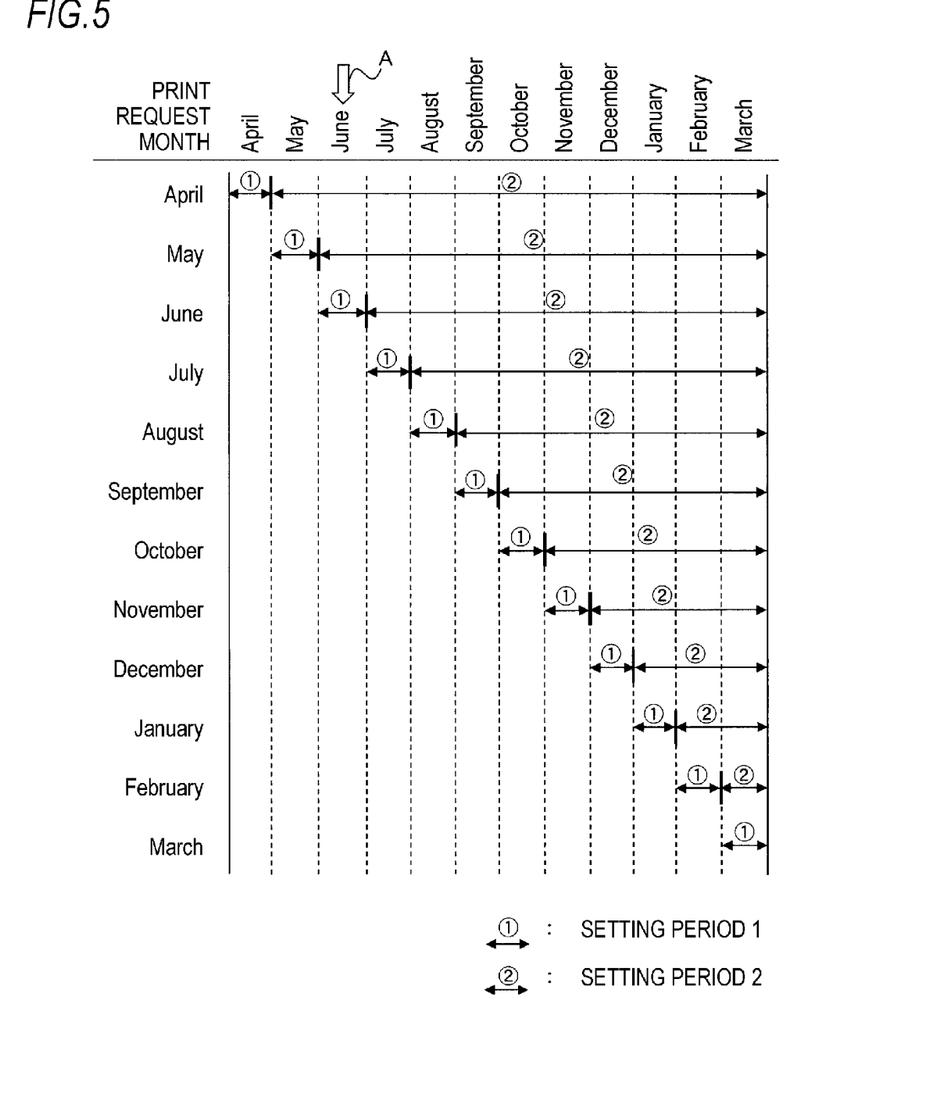
FIG. 5 is a view schematically illustrating a relationship between a setting period 1 and a setting period 2 which are noted in FIG. 3.

First, a setting example of the setting period 1 and the setting period 2 included in the printable amount information is illustrated in FIG. 3, while FIG. 5 schematically illustrates a relationship between the setting period 1 and the setting period 2 which are noted in the table form in FIG. 3. The arrow A in FIG. 5 indicates that the print availability determination request is received in June.

First, for April which is the first month of one year, the setting period 1 is April, and the setting period 2 ranges from May to March. Accordingly, June in which the print availability determination request is received does not belong to the setting period 1 (N in step 104), but belongs to the setting period 2 (Y in step 105). Thus, the printable amount in April is added to t (step 106). The process transitions to the next May (N in step 107). For May, the setting period 1 is May, and the setting period 2 ranges from June to March. Accordingly, June does not belong to the setting period 1 (N in step 104), but belongs to the setting period 2 (Y in step 105).

Thus, the printable amount in May is added to t (step 106). The process transitions to the next June (N in step 107). Since the setting period 1 is June. June belongs to the setting period 1 (Y in step 104). Thus, the printable amount in June is added to t (step 106).

Subsequently, the process transitions to the next July (N in step 107). For July, the setting period 1 is July, and the setting period 2 ranges from August to March. Accordingly, since June does not correspond to either the setting period 1 or the setting period 2 (N in both steps 104 and 105), the printable amount set in the printable amount information of July does not become a target for addition. In the following months from August to March as well, the printable amount of each month does not become a target for addition, similarly to July.

When the processes for respective months are completed as described above (Y in step 107), the printable amount t in June is determined. Here, when the printable amount t is equal to or larger than the requested usage amount (Y in step 108), the availability determination unit 12 determines that printing in the requested number of printing sheets is available, and responds to the print availability determination request by transmitting the executability information indicating that printing is available to the printing device 2 (step 109). Meanwhile, when the printable amount t is smaller than the requested usage amount (N in step 108), the availability determination unit 12 determines that printing in the requested number of printing sheets is unavailable, and transmits the non-executability information indicating that printing is not available to the printing device 2 in response to the print availability determination request (step 110).

When receiving a response "printing unavailable" from the usage amount management server 10 in response to the print availability determination request, the printing device 2 notifies the user that the printing is unavailable and does not perform printing. When receiving a response "printing available", the printing device 2 performs printing in response to the request from the user.

Figure 6:
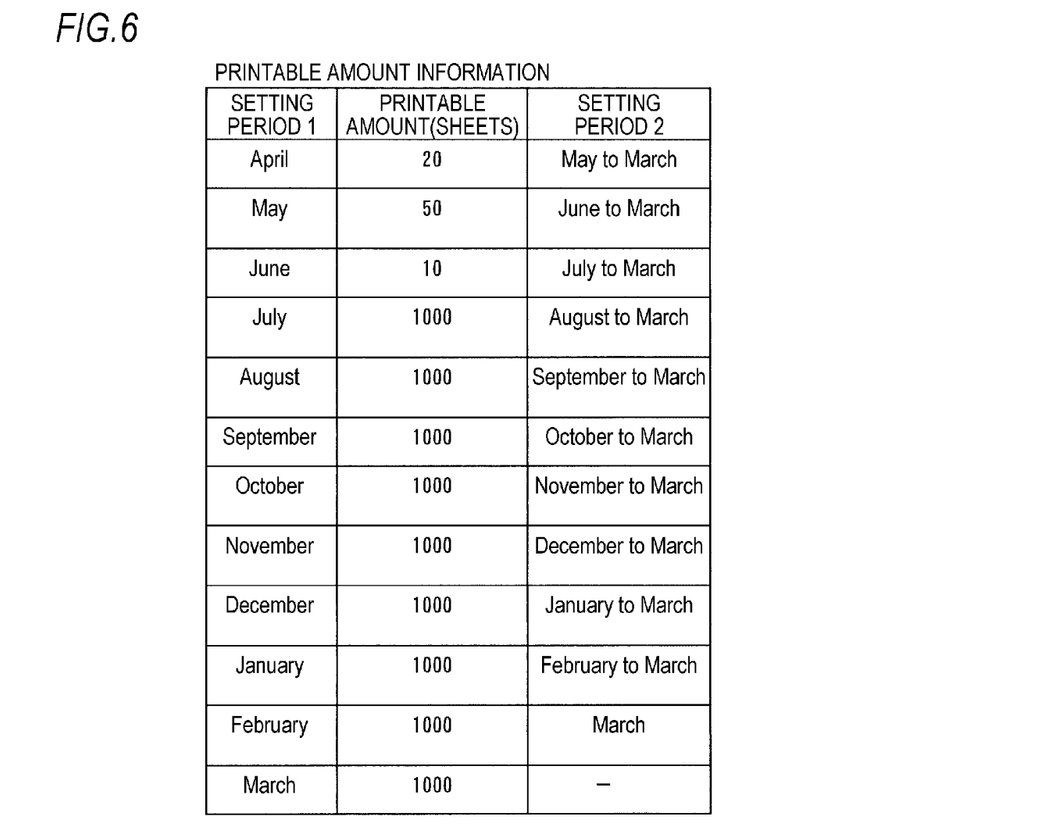
FIG. 6 is a view illustrating a setting example of printable amount information at the point of time when a print availability determination request is received in the exemplary embodiment.

FIG. 6 is a view illustrating a setting example of printable amount information at the point of time when the print availability determination request is received from the printing device 2. According to the setting example, in April, 980 sheets have been used, and as a result, the printable amount is set as 20 sheets. That is, the remaining usable amount is 20 sheets. In May, 950 sheets have been used, and as a result, the printable amount is set as 50 sheets. That is, the remaining usable amount is 50 sheets. In June, at the present point of time, 990 sheets have been used, and as a result, the printable amount is set as 10 sheets. Under such circumstances, when the usage amount management server 10 receives a print availability determination request with 40 sheets as a requested usage amount, according to the above described process, the availability determination unit 12 determines that printing is available because a value t obtained by adding up printable amounts in April to June becomes 80 sheets.

Meanwhile, in the case of "printing available," the information update unit 13 has to update the printable amount by subtracting the number of printing sheets corresponding to the requested usage amount, but various methods are considered as to how many sheets are subtracted from which month. Accordingly, in the exemplary embodiment, in principle, subtraction is performed firstly from the printable amount of June in which the print availability determination request is received. Then, when the remaining printable amount of June does not satisfy the requested usage amount as in the setting example illustrated in FIG. 6, in the exemplary embodiment, it is assumed that the remaining printable amount in the past month may be carried forward and used. That is, even if the usable amount (10 sheets) of June corresponding to the point of time when the print availability determination request is received is less than the requested usage amount (40 sheets), the availability determination unit 12 determines that the execution is possible when the usable amount obtained by carrying forward the remaining usable amounts (20 sheets and 50 sheets) from past months (April and May) in one year (from April to March) is equal to or larger than the requested usage amount.

In the exemplary embodiment, as described above, the printable amount remaining without being used up is consumed so as to respond to a print request from a user. As described above, the remaining usable amount is effectively utilized while usable amounts of the following months are not allowed to be used in advance, so that it is possible to maintain the objective achievement such as TCO reduction and respond to the request from the user. Since the usage amount management server 10 adjusts a printable amount, a load for management of the number of printing sheets, that is imposed on the user or the administrator, may be reduced.

Meanwhile, 10 sheets out of the requested usage amount (40 sheets) are consumed from the printable amount of June as in the example, while various methods may be considered as to which month's remaining usable amount is used for the rest, 30 sheets. Accordingly, in the exemplary embodiment, it is assumed to use the remaining usable amount of the oldest month first. According to the setting example illustrated in FIG. 6, 20 sheets in April, and 10 sheets in May are used, respectively.

In the exemplary embodiment, the usable amount of June corresponding to the point of time when the print availability determination request is received is consumed with the highest priority, but the present invention is not limited thereto. For example, consumption may be made firstly from the rest of usable amounts.

As described above, the information update unit 13 determines the number of printing sheets to be subtracted in each month, and updates the printable amount by subtraction. In the exemplary embodiment, the printable amount is updated according to the requested usage amount. Meanwhile, while the printing device 2 actually executes printing, printing result information including the corresponding number of printing sheets may be transmitted to the printing device 2. Then, the information update unit 13 may receive the printing result information, confirm that printing in the requested usage amount has been actually made, and update the printable amount.

Meanwhile, in the above description, the remaining usable amount in the past month is allowed to be carried forward without any restriction and consumed, but the printable amount that is allowed to be carried forward from the past month (carriable amount) may be limited. Since the amount has not been used in the past month, an effect of achieving the objective such as TCO reduction may be improved. In contrast, when a carrying-forward usage is allowed, although an achievement of the objective such as TCO reduction may be maintained, the effect thereof will be diminished. Accordingly, by not allowing all of the remaining printable amounts in the past months to be used up, it is possible to prevent an effect of achieving the objective such as TCO reduction from lowering.

For example, when determining a print availability, the availability determination unit 12 may set an amount that is allowed to be carried forward from a past month by multiplying a remaining usable amount of the corresponding past month by a fixed ratio. As a fixed ratio, for example, 90% of a usable amount of the last month is allowed to be used, and 80% of a usable amount of the month before last is allowed to be used. In the case of the setting example illustrated in FIG. 6, 45 sheets out of the remaining usable amount (50 sheets) of May are allowed to be used, and 16 sheets out of the remaining usable amount (20 sheets) of April are allowed to be used. In this way, a fixed ratio is gradually decreased in inverse sequence of date, but it is possible to multiply by a uniform ratio for each month.

Alternatively, an upper limit may be set to the total amount that is allowed to be carried forward from the past months. For example, in the above described example, 20 sheets from April, and 10 sheets from May, that is, 30 sheets in total, are allowed to be carried forward, but the upper limit may be set to the usage amounts to be carried forward.

In the exemplary embodiment, it is assumed that as long as there is a remaining printable amount, the remaining printable amount may be carried forward for a user or a group who has issued a print request without distinction, but it may be allowed to carry forward the amount only in response to an availability determination request for a predetermined user or group. Whether a user or a group is a predetermined user or a predetermined group for whom carrying-forward is allowable may be set in the printable amount information, or in user group information (not illustrated), and the information may be referred to. For example, when a group (department) requires an amount of prints not affected by a change in season, it is considered that it is not necessary to allow a carrying-forward usage. Accordingly, it is possible to prevent wastefulness, and to further improve an effect of achieving the objective such as TCO reduction.

In the exemplary embodiment, descriptions have been made on an exemplary case where one year is set as a first period to which an upper limit value of the number of printing sheets which it is not allowed to exceed is set, and a month is set as a second period that is set by dividing the first period into plural periods. It should be noted that the settings of the respective periods are exemplary and that the respective periods are not limited to the above case. For example, a year as the first period may be divided into quarters or may be divided into weeks. The first period may correspond to three years or a month. The length of each of the first period and the second period may be properly set according to an operation or the like.

In the exemplary embodiment, descriptions have been made on the example where the upper limit value (12,000 sheets) of the number of printing sheets for one year is equally allocated to respective months (1,000 sheets for each), for convenience. It should be noted that the numbers of sheets to be allocated to respective months may not be necessarily equal to each other and may be properly set by an administrator in consideration of a change in season or the like. In the exemplary embodiment, a relatively large amount of sheets may be allocated to April to which no printable amount is carried forward from the last month so as to give a margin to the printable amount in April.

In the exemplary embodiment, the usage amount management server 10 is provided separately from the printing device 2. This makes it possible to integrate plural printing devices 2 and manage printable amounts in the entire system. When only one printing device 2 is included in the system, the function of the usage amount management server 10 may be mounted on the printing device 2.

In the exemplary embodiment, the number of printing sheets is taken as an example of a usage amount of a function, and the number of printing sheets in a system is considered as a management target in the above description.

Alternatively, the usage amount may be limited to, for example, the number of color printing sheets, the number of printing sheets of paper size A3 or the like, which may be considered as a management target. As a function, a print function has been described as an example, but other functions such as, for example, a copy function, a FAX function and the like may be employed, and in this case, the number of copies, the number of FAX transmissions, the number of transmitted faxes and the like may be considered as management targets.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a transmitter that
refers to a memory in response to an availability determination request with designation of a requested usage amount of a function, the memory storing a usable amount for each of second periods which are set by dividing a first period into a plurality of periods, an upper limit value of a usage amount of the function which it is not allowed to exceed being set to the first period, the usable amount for each of the second periods being set as an initial value by allocating the upper limit value to the second periods, and
transmits executability information to a request source of the availability determination request when the function in the requested usage amount is executable; and
an update unit that updates the usable amounts stored in the memory based on the requested usage amount, wherein
even if the usable amount in a second period corresponding to a point of time when the availability determination request is received is less than the requested usage amount, the transmitter transmits the executability information when a usable amount obtained by carrying forward a remaining usable amount from a past second period in the first period is equal to or larger than the requested usage amount.

2. The information processing apparatus according to claim 1, wherein the transmitter limits an amount to be carried forward from the past second period.

3. The information processing apparatus according to claim 2, wherein the transmitter sets an amount that is allowed to be carried forward from the past second period by multiplying the remaining usable amount of the past second period by a fixed ratio.

4. The information processing apparatus according to claim 2, wherein the transmitter sets an upper limit to a total amount that is permitted to be carried forward from the past second period.

5. The information processing apparatus according to claim 1, wherein
in the memory, the usable amount is set for each user or each group to be used as a management unit of the usage amount, and
the transmitter uses the remaining usable amount carried forward from the past second period only in response to the availability determination request for a predetermined user or group.

6. A function usage amount management system comprising:
a function executing device that executes a function;
an information processing apparatus; and
a memory that stores a usable amount for each of second periods which are set by dividing a first period into a plurality of periods, an upper limit value of a usage amount of the function which it is not allowed to exceed being set to the first period, the usable amount for each of the second periods being set as an initial value by allocating the upper limit value to the second periods, wherein
the information processing apparatus includes
a transmitter that
refers to the memory in response to an availability determination request from the function executing device with designation of a requested usage amount of the function, and
transmits executability information to a request source of the availability determination request when the function in the requested usage amount is executable, and
an update unit that updates the usable amounts stored in the memory based on the requested usage amount, and
even if the usable amount in a second period corresponding to a point of time when the availability determination request is received is less than the requested usage amount, the transmitter transmits the executability information when a usable amount obtained by carrying forward a remaining usable amount from a past second period in the first period is equal to or larger than the requested usage amount.

7. A non-transitory computer readable storage medium storing a program causing a computer to function as units comprising:
a transmitter that
refers to a memory in response to an availability determination request with designation of a requested usage amount of the function, the memory storing a usable amount for each of second periods which are set by dividing a first period into a plurality of periods, an upper limit value of a usage amount of the function which it is not allowed to exceed being set to the first period, the usable amount for each of the second periods being set as an initial value by allocating the upper limit value to the second periods, and
transmits executability information to a request source of the availability determination request when the function in the requested usage amount is executable; and
an update unit that updates the usable amounts stored in the memory based on the requested usage amount, wherein
even if the usable amount in a second period corresponding to a point of time when the availability determination request is received is less than the requested usage amount, the transmitter transmits the executability information when a usable amount obtained by carrying forward a remaining usable amount from a past second period in the first period is equal to or larger than the requested usage amount.

\* \* \* \* \*